US005746091A

United States Patent [19]

Schaede

[11] Patent Number: 5,746,091

[45] Date of Patent: May 5, 1998

[54] DEVICE FOR ELIMINATING PLAY IN GEAR WHEELS

[75] Inventor: Johannes Georg Schaede, Würzburg, Germany

[73] Assignee: Koenig & Bauer-Albert Aktiengesellschaft, Wurzburg, Germany

[21] Appl. No.: 544,580

[22] Filed: Oct. 18, 1995

[30] Foreign Application Priority Data

Oct. 18, 1994 [DE] Germany .......................... 44 37 145.4

[51] Int. Cl.[6] .......................... F16H 55/18; B41F 13/012

[52] U.S. Cl. .......................... 74/409; 74/421 R

[58] Field of Search .......................... 74/409, 421 R

[56] References Cited

U.S. PATENT DOCUMENTS

| | | | |
|---|---|---|---|
| 2,162,282 | 6/1939 | Leishmam | 74/409 |
| 3,167,967 | 2/1965 | Silberger | 74/409 |
| 3,773,316 | 11/1973 | Stemmle | 74/409 |
| 4,714,388 | 12/1987 | Siler . | |
| 5,161,424 | 11/1992 | Saberton et al. | 74/409 |

FOREIGN PATENT DOCUMENTS

| | | |
|---|---|---|
| 2021136 | 7/1970 | France . |
| 28 15 534 | 10/1983 | Germany . |
| 39 01 076 | 8/1989 | Germany . |

*Primary Examiner*—Charles A. Marmor
*Assistant Examiner*—David M. Fenstermacher
*Attorney, Agent, or Firm*—Jones, Tullar & Cooper, P.C.

[57] ABSTRACT

Gear wheel play between cooperating gears of two cylinders whose axial spacing can be varied, in a rotary printing press can be eliminated by use of a free wheeling gear supported on the journal of the first of the two cylinders and engaging the gear wheel on the second cylinder. A circumferential shifting of the free wheeling gear will eliminate gear wheel play. A phase adjusting gear assembly is used to accomplish the circumferential phase shifting of this gear.

5 Claims, 2 Drawing Sheets

DEVICE FOR ELIMINATING PLAY IN GEAR WHEELS

FIELD OF THE INVENTION

The present invention is directed generally to a device for eliminating play in gear wheels. More particularly, the present invention is directed to a device for eliminating play between two directly cooperating gear wheels. Most specifically, the present invention is directed to a device for the elimination of play between two directly cooperating gear wheels on cylinders of a rotary printing press. The two cylinders are situated at an adjustable distance from each other. Each of the two cylinders carries a gear wheel that is fixed to and thus is not rotatable with respect to the cylinder. A first one of the cylinders also carries a gear or a toothed segment whose circumferential position is adjustable with respect to the fixed gear that is carried by that cylinder. This adjustable toothed segment engages the gear wheel of the second cylinder. Circumferential movement of the toothed segment with respect to the first, fixed gear wheel eliminates play between the first and second gear wheels.

DESCRIPTION OF THE PRIOR ART

It is generally known in the prior art to drive cooperating cylinders in a rotary printing press with gear wheels that are secured to the ends of their respective cylinders or to support journals for these cylinders. It is, of course, desirable that the drive coupling between these cylinders be positive and accurate so that rotation of one cylinder will result in a corresponding rotation of the second cylinder. However, gear play inevitably is present no matter how well mated the two gear wheels may be. Wear is one cause of gear play. Another frequent cause of such gear play is the capability of the two cylinders for being shiftable toward or away from each other. Such shifting may be necessary to accommodate for differing physical characteristics of the medium to be printed as it passes between the two cylinders.

One prior art device that is usable to eliminate play in the gear drive of cylinders, such as in impression cylinders and transfer rollers in printing presses, is set forth in German Patent Publication DE 28 15 534 C2. In this prior art arrangement, a first gear wheel is provided with a toothed segment and cooperates with a second gear wheel. Gear play is eliminated by of adjusting the toothed segment in the circumferential direction with respect to the first gear wheel. A limitation of this prior art device is that such an adjustment cannot be made during rotational movement of the cylinders.

It will be seen that a need exists for a way to eliminate gear wheel play which overcomes the limitations of the prior art devices. The device for eliminating play in gear wheels in accordance with the present invention provides such a device and is a significant improvement over the prior art.

SUMMARY OF THE INVENTION

It is an object of the present invention to provide a device for eliminating play in gear wheels.

Another object of the present invention is to provide a device for eliminating play between two directly cooperating gear wheels.

A further object of the present invention is to provide a device for the elimination of play between two directly cooperating gear wheels on cylinders of a rotary printing press.

Still another object of the present invention is to provide a device for eliminating play in gear wheels on two cylinders that have a variable distance from each other.

Even a further object of the present invention is to provide a device for eliminating play in gear wheels in which play caused by cylinder shifting can be compensated for during the course of rotational movement of the cylinders.

As will be discussed in detail in the description of the preferred embodiment which is presented subsequently, the device for eliminating play in gear wheels in accordance with the present invention is usable particularly in cooperation with cylinders of a rotary printing press and in which the cylinders are disposed at a distance from each other and further wherein this distance can be changed during operation of the rotary printing press. A first cylinder carries a first gear wheel and a second cylinder carries a second gear wheel. These two gear wheels are fixed or secured to their respective cylinders. A toothed segment or gear is supported by the first cylinder so that it is in engagement with the second gear wheel and further so that it is adjustable circumferentially with respect to the gear wheel on the first cylinder. A phase adjusting gear assembly is provided for accomplishing the circumferential adjustment of the toothed segment or gear. The position of the toothed segment or gear with respect to the first gear wheel can be changed during rotation of the rotary printing press.

A primary advantage of the present invention is that it is usable with cylinders whose shaft spacing distances with respect to each other are variable. For example, in rotogravure or offset printing, it is necessary to adapt the distance between the printing and the impression cylinders or between the rubber blanket and the impression cylinders in accordance with the thickness or the surface shape of the material to be printed. As the spacing between the cylinder pair is changed, the play between the drive gears carried by each of these cylinders will also be changed. If the spacing between the cylinders is increased, there will be an increase in play between the gear wheels. This will be apt to result in vibrations that are harmful to the press operation. If the spacing between the cylinder is decreased, the gear wheel teeth can become jammed and damage to the gear wheels may result. In order to avoid these problems, it is important to be able to adjust the play between the gear wheels in response to or in accordance with the axial spacing distance of the cylinders. It is a particular advantage of the present invention that the device for eliminating play in gear wheels in accordance with the present invention permits such an adjustment in gear wheel play during operation of the printing press. In this way, the set-up time of the press is reduced and expensive and time consuming interruptions in the production schedule of the printing press are not necessary.

The adjustment of the toothed segment or gear which accomplishes the elimination of gear wheel play and which acts as a part that rotates with the phase adjusting gear assembly, of which it is a part, makes the elimination of gear wheel play easily accomplished. There are no spring loaded parts in the toothed segment, as has been the case in the prior art devices. This means that the toothed segment or gear, which is responsible for the elimination of gear wheel play, does not impose any increased load on the gear wheels. The phase adjusting gear assembly interlockingly reduces gear wheel play by displacing the toothed segment or gear in the circumferential direction with respect to the gear wheels between which play is to be eliminated. This does not generate any additional forces that will act on the gear wheels.

The device for eliminating play in gear wheels in accordance with the present invention overcomes the limitations of the prior art. It is a substantial advance in the art.

BRIEF DESCRIPTION OF THE DRAWINGS

While the novel features of the device for eliminating play in gear wheels in accordance with the present invention will be set forth with particularity in the appended claims, a full and complete understanding of the invention may be had by referring to the detailed description of the preferred embodiment which is presented subsequently, and as illustrated in the accompanying drawings, in which:

DETAILED DESCRIPTION OF THE PREFERRED EMBODIMENT

Figure 1:
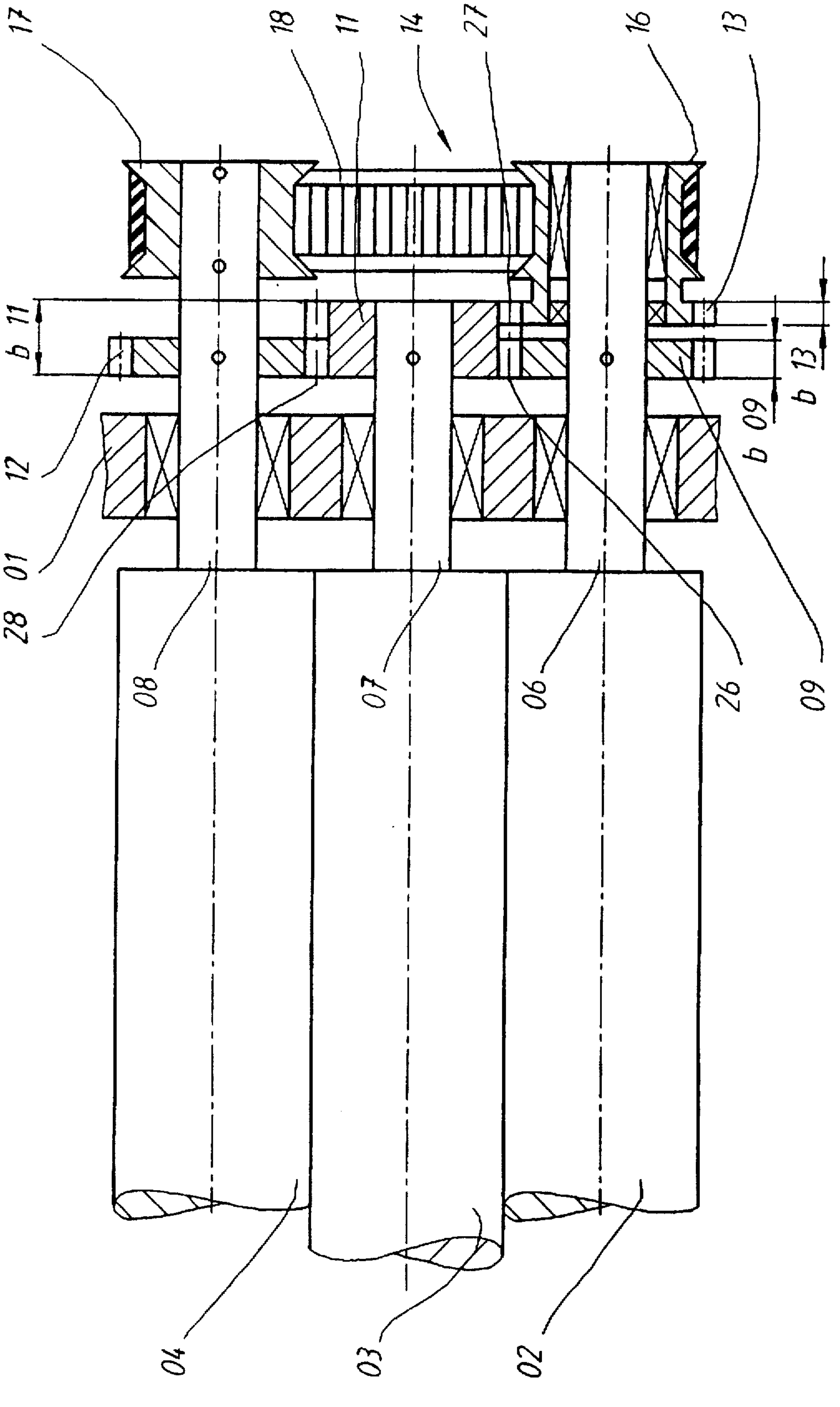
FIG. 1 is a schematic side elevation view, partly in section of a portion of a rotary printing press and showing the device for elimination of play in gear wheels in accordance with the present invention.

Referring initially to FIG. 1, there may be seen a preferred embodiment of a device for eliminating play in gear wheels in accordance with the present invention. There are depicted portions of three cylinders 2, 3 and 4, which are part of a generally conventional rotary printing machine which itself will not be discussed in detail. A first of these cylinders, which is denoted as cylinder 2, may be a printing cylinder. The second cylinder 3 may be, for example, an impression cylinder, and the third cylinder 4 may be, for example, a transfer roller. These three cylinders are seated for rotation in side frames 1 of a rotary printing press which may be, for example, a sheet-fed rotogravure printing press. It will be understood that only one side frame 1 is depicted in FIG. 1. The printing cylinder 2 cooperates with the impression cylinder 3 to print a material passing between these cylinders. The two cylinders 2 and 3 have an axial spacing distance a23 which is shown more clearly in FIG. 2. It will be understood that this axial spacing distance a23 is variable in that it can be changed in accordance with the various operational states in which the rotary printing press may be placed. The transfer cylinder 4 cooperates with the impression cylinder 3.

All three of the cylinders 2, 3 and 4 are supported for rotation in the side frames 1 by journals 6, 7 and 8 respectively, it being understood that suitable bearings are interposed between the cylinder journals 6, 7 and 8 and the side frame 1, as shown schematically in FIG. 1. The journals 6, 7 and 8 each are provided with a first gear wheel 9, 11 and 12, respectively with these gear wheels 9, 11 and 12 being secured to their respective journals 6, 7 and 8 in a manner which prevents relative rotation between these gears and their respective journals. These gear wheels 9, 11 and 12 transmit the necessary driving torque to the cylinders 2, 3 and 4 in a generally known manner.

As may be seen in FIG. 1, a second gear or toothed segment 13 is supported by the journal 6 of the printing cylinder 2. This gear 13 is not directly attached to the journal 6 but instead is supported by suitable bearings that are interposed between it and the cylinder journal 6. This second gear 13 or toothed segment 13 has a width b13 and is in toothed engagement with the gear wheel 11 carried by the journal 7 of the impression cylinder 3. This impression cylinder gear wheel 11 has a width b11 that is approximately equal to the sum of the width b9 of the printing cylinder gear wheel 9 plus the width b13 of the second gear or toothed segment 13 of the printing cylinder plus a space between the two.

Figure 2:
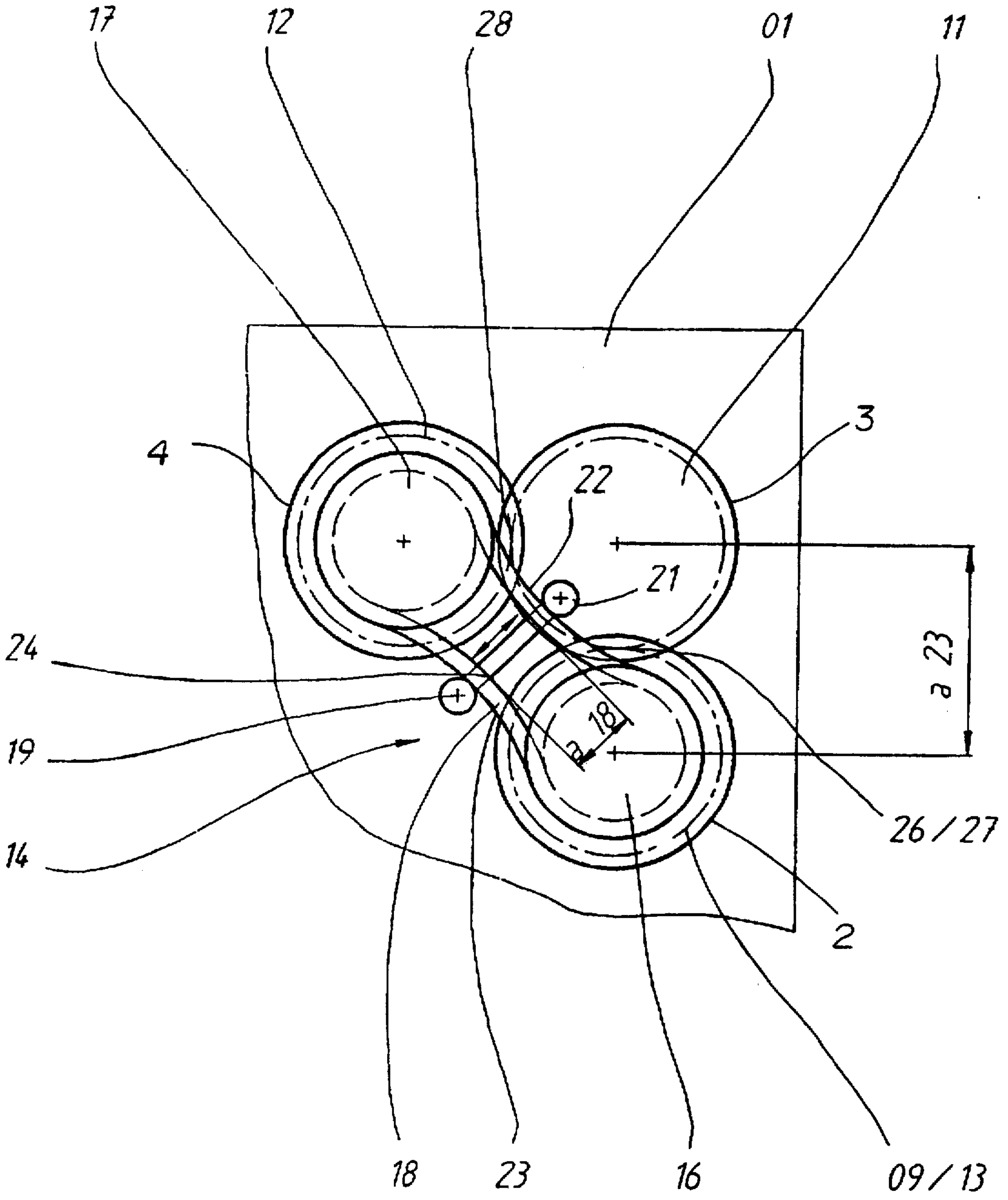
FIG. 2 is a schematic end view of the assembly of FIG. 1 and showing the phase adjusting gear assembly.

As may be seen in both FIGS. 1 and 2, a phase adjusting gear assembly, generally at 14 is supported by the side frame 1 and is used to change the circumferential phase angle of the second gear or toothed segment 13 with respect to the printing cylinder gear wheel 9 to thereby eliminate play between the gear wheels 9 and 11. This phase adjusting gear assembly 14 cooperates with the printing cylinder 2 and the transfer cylinder or roller 4 but does not directly contact the impression cylinder 3. In the preferred embodiment, the phase adjusting gear assembly 14 is embodied as a traction mechanism gear arrangement and specifically as a toothed belt gear. This phase adjusting gear assembly 14 essentially consists of first and second toothed pulleys 16 and 17 which are connected by, and which support a toothed drive belt 18. The first or driven pulley 16 is securely fastened or connected with the second freely-rotatable gear or toothed segment 13 and is supported by a suitable bearing assembly on the journal 6 of the printing cylinder 2. The second or drive pulley 17 of the phase adjusting gear assembly 14 is securely attached to the journal 8 of the transfer roller or cylinder 4. This second pulley 17 thus rotates at the same speed as the transfer roller gear wheel 12. The gear wheel 12 of the transfer roller 4 and the freely rotatable gear or toothed segment 13, as well as the fixed printing cylinder gear wheel 9 have the same gear ratio as the two pulleys 16 and 17 of the phase adjusting gear assembly. In the preferred embodiment this gear ratio is 1 to 1. However, other gear ratios are also possible.

The toothed belt 18 is positioned about the two pulley 16 and 17, as may be seen in both FIGS. 1 and 2, and is guided and constrained by two tension rollers 19 and 21, which are shown in FIG. 2. The tension roller 21 engages the working or drive strand 22 of the toothed belt 18 while the tension roller 19 engages the returning strand 23 of the toothed belt 18. These two tension rollers 19 and 21 are carried at opposing ends of a common coupler 24 which operates to define a spacing distance a18 between the working and returning strands 22 and 23 of the belt 18. The toothed belt 18 is tightened by reducing this spacing distance al8 by effecting a suitable size adjustment of the coupler 24. The coupler 24 and thus the two tension rollers 19 and 21 can also be shifted in a direction generally perpendicular to a plane extending between the rotational axes of the printing cylinder 2 and the transfer roller 4. This shift direction of the coupler 24 is denoted by the double headed arrow placed adjacent the coupler 24 in FIG. 2. Shifting of the coupler 24 in the direction toward the impression cylinder 3 will effectively shorten the length of the belt working strand 22 and will lengthen the effective length of the belt returning strand 23. This will have the effect of causing the first belt pulley 16 to rotate in the clockwise direction, as viewed in FIG. 2. This will cause a circumferential phase shift of the second or pulley gear or toothed segment 13 with respect to the printing cylinder gear wheel 9. The shifting of the coupler 24 also results in a change in the phase position of the two pulleys 16 and 17 with respect to each other. It is this phase change that accomplishes the elimination of gear wheel play between the printing cylinder gear wheel 9 and the impression cylinder gear wheel 11. It will be understood that the phase relationship between gear wheels 9 and 11 does not change but that the circumferential phase changes between printing cylinder gear 9 and the pulley gear or toothed segment 13 and that this change effectively eliminates play between the gear wheels 9 and 11.

In operation of the device for eliminating gear play in accordance with the present invention it will be at first understood that there may be play at a first or a second contact point 26 or 27 between the gear wheels 9 and 11 or the gear wheels 13 and 11, respectively of the printing and impression cylinders 2 and 3. There may also be gear wheel play at a contact point 28 of the gear wheels 11 and 12 of the impression cylinder 3 and the transfer roller 4. A phase shift or displacement of the angle of rotation; i.e. a displacement in the circumferential direction of the pulley gear or tooth segment 13 with respect to the printing cylinder gear wheel 9 will effectively eliminate this gear play. As was discussed above, the circumferential displacement of the pulley gear or toothed segment 13 with respect to the impression cylinder gear wheel 9 will be accomplished by shifting of the tension roller coupler 24 of the phase adjustment gear assembly 14. The second gear wheel 13 of the printing cylinder 2 acts as a rigid part which passively co-rotates with rotation of the pulley 18. During the course of actuation of the phase adjustment gear assembly 14, the circumferential speeds of the gear wheels 9, 11 and 13 at the contact points 26 and 27 of the printing and impression cylinders 2 and 3 are the same and continue to remain the same.

If the axial spacing distance a23 between the printing cylinder 2 and the impression cylinder 3 is changed during the operation of the rotary printing press, this will change the gear wheel play. This change in gear wheel play can be compensated for by use of the phase actuating gear assembly 14 even while the cylinders continue to rotate.

In accordance with the present invention, it is possible to provide the free-wheeling gear 13 only as a toothed segment if freedom from gear wheel play is required in only one place or in only one area of the circumference. The third gear wheel 12 need not be used to drive the transfer roller 4 but instead could be supported independently of the transfer roller or cylinder 4. It is also not necessary that the pulleys 16 and 17 of the phase adjusting gear assembly 14 be directly connected with the gear wheels 12 and 13 of the cylinders 4 and 2. Any number of interposed wheels also having different diameters could be possible. However, in this regard it is common for the gear wheels 12 and 13 of the cylinders 4 and 2, and possibly for the gear teeth of the adjacent gear belt 18 to generate equal circumferential speeds at the contact points 26 and 27 of the printing and the impression cylinders 2 and 3.

Once the coupler 24 has been moved through an appropriate adjustment distance, it is held in place. A threaded spindle could be used to hold the coupler 24 in a rigid instead of a resilient manner. In this way gear wheel play is eliminated by an interlocking action.

While a preferred embodiment of a device for eliminating play in gear wheels in accordance with the present invention has been set forth fully and completely hereinabove, it will be apparent to one of skill in the art that a number of changes in, for example, the overall sizes of the cylinders, the number of teeth in the gear wheels, the drive for the rotary printing press and the like could be made without departing from the true spirit and scope of the present invention which is accordingly to be limited only by the following claims.

What is claimed is:

1. A device for the elimination of play between first and second directly cooperating gear wheels supported on first and second journals of first and second cylinders of a rotary printing press and in which said first and second cylinders are disposed at an axial spacing distance from each other and in which said axial spacing distance is changeable during operation of said rotary printing press, said device comprising:
   - a toothed segment rotatable supported on said first journal coaxial with said first gear wheel and in engagement with said second gear wheel, said toothed segment being shiftable on said first journal in a circumferential direction with respect to said first gear wheel; and
   - a phase adjusting gear assembly for effecting said circumferential shifting of said toothed segment with respect to said first gear wheel during operation of said rotary printing press.

2. The device in accordance with claim 1 wherein said phase adjusting gear assembly includes a toothed belt and first and second toothed pulleys and further includes two coupled tension rollers, said toothed belt being carried by said first and second toothed pulleys, said toothed belt having a working strand and a returning strand with said working and returning strands extending between said first and second toothed pulleys, said coupled tension rollers engaging said working and returning strands of said toothed belt and being shiftable during rotation of said first and second cylinders.

3. The device of claim 2 wherein said first pulley is secured to said toothed segment.

4. The device in accordance with claim 2 further including a third gear wheel, said third gear wheel meshing with said second gear wheel and wherein said second pulley is connected with said third gear wheel.

5. The device in accordance with claim 2 wherein said coupled tension rollers are displaceably disposed and further wherein displacement of said coupled tension rollers changes effective lengths of said working and return strands of said toothed belt.

* * * * *